(12) United States Patent
Nakamichi et al.

(10) Patent No.: US 7,328,223 B2
(45) Date of Patent: Feb. 5, 2008

(54) STORAGE MANAGEMENT SYSTEM AND METHOD

(75) Inventors: Koji Nakamichi, Kawasaki (JP); Akira Nagata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 554 days.

(21) Appl. No.: 10/898,365

(22) Filed: Jul. 26, 2004

(65) Prior Publication Data

US 2005/0210098 A1    Sep. 22, 2005

(30) Foreign Application Priority Data

Mar. 16, 2004    (JP) .............................. 2004-074749

(51) Int. Cl.
*G06F 11/00*    (2006.01)
(52) U.S. Cl. .................................. 707/104.1
(58) Field of Classification Search .............. 707/104.1
See application file for complete search history.

(56) References Cited

U.S. PATENT DOCUMENTS 5,586,250 A * 12/1996 Carbonneau et al. ......... 714/44
6,876,656 B2 * 4/2005 Brewer et al. .............. 370/392
6,944,127 B1 * 9/2005 Burchfiel et al. ........... 370/235
2004/0114569 A1 * 6/2004 Naden et al. ................ 370/351

FOREIGN PATENT DOCUMENTS

| JP | 2002-91706 | 3/2002 |
| JP | 2003-128890 | 5/2003 |
| JP | 2003-140836 | 5/2003 |
| JP | 2003-216474 | 7/2003 |

* cited by examiner

*Primary Examiner*—Chong H Kim
(74) *Attorney, Agent, or Firm*—Staas & Halsey LLP

(57) ABSTRACT

In a storage management system and method which virtualizes a plurality of storage devices distributed over a network to be managed, a storage state manager, in a storage management server, manages a storage usage state in each storage device, a network state manager manages a traffic state of each network device, and a path searching/setup portion determines a storage data path to be set up in the network device based on the storage usage state and the traffic state. In a host, a virtualization mapper associates a storage space replied from the storage management server with a virtual storage, and a path information setup portion transmits/receives storage data with the storage data path.

19 Claims, 17 Drawing Sheets

FIG.3

| | STORAGE DEVICE NAME (18a) | STORAGE DEVICE IP ADDRESS (18b) | LUN ID (18c) | LUN CAPACITY (18d) | LUN AVAILABLE SPACE (18e) |
|---|---|---|---|---|---|
| ENTRY 18_1 | STORAGE 300_1 | 20.0.10.1 | LUN1 | 50M | 20M |
| | | | LUN2 | 200M | 200M |
| | | | | | |
| | | | | | |
| | | | | | |
| | | | | | |
| 18_2 ADDITIONAL REGISTRATION | STORAGE 300_2 | 30.0.10.1 | | | |
| | | | | | |
| | | | | | |
| | | | | | |
| | | | | | |
| | | | | | |
| | | | | | |

Table 18

FIG.5

| | HOST INFORMATION 16a | | VIRTUAL VOLUME INFORMATION 16b | | RAID INFORMATION 16c | LOGICAL VOLUME INFORMATION 16d | |
|---|---|---|---|---|---|---|---|
| | 16a1 | 16a2 | 16b1 | 16b2 | 16c1 | 16d1 | 16d2 |
| | HOST NAME | HOST IP ADDRESS | VIRTUAL VOLUME NAME | VIRTUAL VOLUME CAPACITY (BYTE) | RAID LEVEL | STORAGE DEVICE IP ADDRESS | LUN ID |
| | HOST 200 | 10.0.0.101 | VOLUME 1 | 1G | RAID1 | 20.0.10.1 | LUN1 |
| | | | | | | 20.0.10.1 | LUN2 |
| | | | | | | 30.0.10.1 | LUN3 |
| | HOST 201 | 10.0.0.201 | VOLUME 2 | 500M | RAID1 | 40.0.10.1 | LUN4 |
| | | | | | | 50.0.10.1 | LUN5 |

| | | | TRAFFIC | |
|---|---|---|---|---|
| 20a | 20b | 20c | 20d | 20e |
| NETWORK DEVICE (NODE) ID | NETWORK DEVICE IP ADDRESS | LINK ID | NUMBER OF iSCSI SESSIONS | USED BANDWIDTH OF LINK |
| SW 400_1 | 10.0.100.101 | link01 | 1 | 20M |
| SW 400_2 | 10.0.200.101 | link02 | 0 | 0M |
| SW 400_3 | 20.0.100.101 | link03 | 3 | 70M |
| ⋮ | ⋮ | ⋮ | ⋮ | ⋮ |
| | | | | |

VIRTUAL VOLUME/LOGICAL VOLUME CORRESPONDENCE TABLE 36

| VIRTUAL VOLUME NAME (36a) | VIRTUAL VOLUME SECTOR INFORMATION (36b) | LOGICAL VOLUME NAME (36c) | LOGICAL VOLUME SECTOR INFORMATION (37d) |
|---|---|---|---|
| Volume #1 | 1-123,456,789 | LUN#1 | 1-123,456,789 |
| | | LUN#2 | 1-123,456,789 |
| | | LUN#3 | 1-123,456,789 |

FIG.9

LOGICAL VOLUME INFORMATION TABLE 37

| LOGICAL VOLUME NAME (37a) | SCSI PORT ID (37b) | iSCSI SESSION ID (37c) |
|---|---|---|
| LUN#1 | Port #1 | #1 |
| LUN#2 | Port #2 | #1 |
| LUN#3 | Port #3 | #2 |

STORAGE MANAGEMENT SYSTEM AND METHOD

BACKGROUND OF THE INVENTION

1. Field of the Invention

The present invention relates to a storage management system and method, and in particular to a storage management system and method which virtualizes a plurality of storage devices distributed over a network to be managed.

Together with recent highly advanced communication technologies, enormous amounts of information such as storage data are transmitted between a host (application server or user) and one or more storage devices. For this transmission, storage virtualization technology of managing one or more storage devices distributed and arranged over the network as a virtualized single storage device has become the more important.

2. Description of the Related Art

Development of Storage Area Network (SAN)

A DAS (Direct Attached Storage) configuration in which an application server (host) directly connects a storage device such as a disk device or tape drive device to the server itself was conventionally mainstream.

However, in recent years, a SAN technology has been developed by which a plurality of storage devices are connected to the application server through a network and storage devices with large capacity are provided to the server. In this SAN technology, a fiber channel (FC) protocol is generally used as a communication protocol between the application server and the storage devices.

A SAN-specific network device such as an FC switch which switches data transferred by e.g. the FC protocol is also generally used. However, the FC-based network device is more expensive compared with a device for a LAN. For this reason, the SAN has less widespread.

Debut of IP-SAN

Among the communication protocol between the application server and the storage devices in the SAN, some protocols having more affinity for IP have made their debuts in recent years, instead of the FC protocol. One of the protocols especially noticed is an iSCSI (SCSI protocol over the Internet) protocol.

This iSCSI protocol prevents a SCSI (Small Computer Systems Interface) command system from being observed from outside by capsuling a SCSI command, which is a standard of a storage field, and the data with a TCP/IP packet, and enables the storage data to be transferred on an IP network. This protocol enables the storage devices to be directly connected to the IP network.

As a result, a conventional hub, router, switch and the like structuring the LAN/WAN can be used for transferring the storage data, so that a reduction of a facility cost and a management cost by integrating the SAN and the LAN is expected.

Furthermore, the iSCSI protocol has the following advantages (1)-(3):

(1) The application server can read and write data in the same procedure as a conventional procedure for accessing a local storage device without awareness of the iSCSI protocol;

(2) Reading from/writing to a disk is performed per block data in the same way as the conventional SAN, so that a file system such as a NAS (Network Attached Storage) is not required on the storage side;

(3) At present, a transfer rate (1 Gbps) of a gigabit Ethernet does not differ very much from a transfer rate (1 Gbps) of the fiber channel-based SAN. However, since it can be considered that a 10 Gbps Ethernet or a higher-speed Ethernet standard makes its debut in the future, further improvements of transfer performance can be expected.

Storage Virtualization

Also, "storage virtualization technology" has made its debut in recent years.

FIG. 17 shows this storage virtualization technology. A storage management device 500, application servers 600_1-600_3 (hereinafter, occasionally represented by a reference numeral 600), a plurality of storage devices such as disk arrays 300_1, 300_2, and a tape device 300_3 (hereinafter, occasionally represented by a reference numeral 300) are mutually connected through a SAN 640.

A plurality of storage devices can be used as a single virtualized storage (storage pool) 350 by the storage virtualization technology.

By a manual setup (see T10) from the storage management device 500, a system manager can divide the virtualized storage 350 into e.g. virtualized storage spaces 351-354, can perform pool assignment of the spaces 351-353 respectively to the servers (hosts) 600_1-600_3, and can leave the space 354 unassigned.

Namely, the virtualized storage pool 350 is prepared by a network connection of the storage devices 300_1-300_3, for example, of a plurality of vendors, so that a physical arrangement of the storage devices 300 can be concealed from the server (or system manager) 600. Also, it becomes possible to flexibly assign and rearrange a storage space independent of the physical arrangement of the storage device 300.

There are some methods for the storage virtualization technology depending on where a conversion/association between the virtualized storage space and an actual storage space is performed.

As a general method, there is a method of performing the conversion/association by a virtualization software within the application server 600. In this method, a volume management software installed in the application server 600 executes the management/assignment of the virtualized storage pool 350. Also, as for the setup/management of the storage virtualization, a method that the system manager inputs/sets up a disk capacity or the like required as a virtual volume on the software is generally adopted, as shown in FIG. 17.

Also, there is a storage management system by which a SAN manager easily performs an arrangement optimization by rearranging the storage space in a plurality of storage devices in a SAN environment (see Patent Document 1).

[Patent document 1] Japanese Patent Application Laid-open No. 2003-140836

Problem (1): Deterioration of Network Transfer Performance

FIG. 18 shows a deterioration example (1) of a network transfer performance, and shows a network in which the storage devices are virtualized in the same way as FIG. 17. Clients 610_1-610_4 and servers (hosts) 600_1 and 600_2 (hereinafter, occasionally represented by a reference numeral 600) of FIG. 18 correspond to the server 600 of FIG. 17. The disk array 300 of FIG. 18 and other storage devices (not shown) correspond to the storage devices 300 (disk arrays 300_1 and 300_2, and tape device 300_3) of FIG. 17. An IP-SAN network 640 composed of routers/ switches 400_1-400_4 of FIG. 18 corresponds to the SAN network 640 of FIG. 17.

In this network, the clients 610_1, 610_2, and the server 600_1 belong to a department (business operation) 620_1, while the clients 610_3, 610_4, and the server 600_2 belong to a department 620_2.

The virtualized storages 350_1 and 350_2 composed of the disk arrays 300 and the like are respectively assigned to the departments 620_1 and 620_2.

When the storage virtualization technology is thus introduced on the IP-SAN network 640, storage data between the hosts and the storage devices coexist on the IP-SAN network 640 to be transferred.

Namely, the storage data between different hosts and different storage devices flow on the same link on the IP-SAN network 640. Thus, a shortage of a bandwidth necessary for the storage data transfer and a transfer delay occur (see fault T20), so that the network transfer performance deteriorates.

FIG. 19 shows a deterioration example (2) of the network transfer performance. In FIG. 19, the IP-SAN network 640 is connected to a WAN 650. In this case, not only the storage data (traffic) between the host and the storage devices, but also normal data (traffic) such as normal voice and Web transferred between the host and the WAN 650 flow on the IP-SAN network 640.

Namely, the normal data and the storage data coexist on the link to be transferred. As a result, congestion, a transmission delay and a bandwidth shortage caused by the congestion occur on the IP-SAN network 640, so that the transfer performance deteriorates (see faults T30 and T31).

When a storage redundancy method of RAID (Redundant Arrays of Independent Disks) 5 or the like is applied in this state with a plurality of storage devices distributed over the network using the virtualization technology, for example, a rate reduction of reading/writing data occurs due to the deterioration of the network transfer performance.

Problem (2): Complicated Virtual Storage Management

When the virtual volume is prepared for the host (server) with the storage virtualization technology, it is required to appropriately determine a used space of disk from the storage devices distributed over the network for a disk capacity required by the host. Namely, it is required to determine a disk space based on a disk utilization and an available space within the storage device 300. By the virtualization method presently performed, a manger estimates an available status of a disk and determines a disk capacity used for the virtual volume and the storage device 300, so that an immediate virtualization is impossible.

Furthermore, in order to perform the virtualization on the IP-SAN network 640, as already mentioned, it is required to determine an appropriate transfer path of the storage data based on a position of a selected disk (storage device) and the usage (utilization) state of the IP-SAN network 640. Also, it is required to set up the determined path in the host and the network device. The manual setup by a manager is a very complicated operation, so that an immediate path determination and its setup are difficult. The path determination and the path setup are not mentioned in the storage management system shown in the above-mentioned patent document 1.

SUMMARY OF THE INVENTION

It is accordingly an object of the present invention to provide a storage management system and method which virtualizes a plurality of storage devices distributed over a network to be managed, wherein a storage virtualization and a storage data path are set up so that storage data transfer performance may not deteriorate.

In order to achieve the above-mentioned object, a storage management system according to the present invention comprises: one or more network devices; one or more hosts and storage devices connected with storage data paths (sessions/connections) on a network composed of the network devices; and a storage management server connected to the network devices, the hosts, and the storage devices; the storage management server having a storage state manager which manages a storage usage state in each storage device, a network state manager which manages a traffic state of the network by monitoring each network device, and a path searching/setup portion which determines the storage data path to be set up in the network device based on the storage usage state and the traffic state.

FIG. 1 shows an operation principle of the storage management system according to the present invention. It shows an IP-SAN network 640 composed of one or more network devices 400_1-400_4 (hereinafter, occasionally represented by a reference numeral 400), a host 200 and storage devices 300_1 and 300_2 (hereinafter, occasionally represented by a reference numeral 300) connected to the network 640, and a storage management server 100 connected to the network devices 400, the host 200, and the storage devices 300. The host 200 is connected to the storage devices 300 with storage data paths (iSCSI sessions in FIG. 1) 700_1 and 700_2 on the network 640. The storage management server 100 is provided with a storage state manager 12, a network state manager 14, and a path searching/setup portion 13.

The storage state manager 12 is connected to each storage device 300 and manages a usage state (e.g. individual disk capacity and utilization of storage device) of each storage device 300.

The network state manager 14 is connected to each network device 400, and manages a traffic state (e.g. available bandwidth and traffic used amount of transmission link) of the storage data paths 700_1 and 700_2, etc. by monitoring each network device 400. The path searching/setup portion 13 determines a path based on the usage state and the traffic state so that the storage data transfer performance does not deteriorate, and sets up the determined path in the network device 400.

Thus, it becomes possible to determine the storage data path corresponding to the usage state of the storage device and the traffic state of the network, and to set up the path in the network device (e.g. switch). Namely, it becomes possible to set up a storage data transfer path so that the storage data transfer performance, which is a management object, concerning the host 200 may not deteriorate.

Also, in the present invention according to the above-mentioned invention, the storage management server may be further provided with a virtual storage manager/controller selecting a storage space suitable for a storage capacity requested from the host or a system manager based on the storage usage state, and the path searching/setup portion may determine the storage data path based on the selected storage space and the traffic state.

Namely, in FIG. 1, the storage management server 100 is further provided with a virtual storage manager/controller 11, which selects a storage space, e.g. the storage device or a disk device, suitable for a storage capacity requested from the host or a system manager, based on the storage usage state of each storage device, e.g. a disk device usage state within the storage device. The virtual storage manager/controller provides the selected storage space to the path searching/setup portion. It is to be noted that the selected storage space is distributed over a plurality of storage spaces (storage devices) in some cases.

The path searching/setup portion determines the storage data path based on the storage space instead of the storage usage state and the above-mentioned traffic state.

Thus, the virtual storage manager/controller may select a storage space used and provide it to the path searching/setup portion.

Also, in the present invention according to the above-mentioned invention, the storage usage state may comprise a used bandwidth of a link or a number of communication channels.

Namely, the path searching/setup portion 13 may introduce a logic in which the storage traffic does not concentrate on a specific path in consideration of the network state, monitor/control e.g. the used bandwidth on the link, select a link with much available bandwidth, and determine a path.

Also, the path searching/setup portion 13 may count e.g. the number of communication channels (sessions) of the iSCSI which is a storage transfer protocol on an IP network as the storage traffic state on the path (link), select a link on which the number of sessions (communication channels) is small, and determine the storage data path.

Thus, it becomes possible to determine a path by which the storage data transfer performance does not deteriorate.

Also, in the present invention according to the above-mentioned invention, when determining a storage data path of a single host, the path searching/setup portion may monitor a path usage state of another host as the traffic state, and may determine the storage data path of the host based on the traffic state.

Namely, when determining a storage data path of a single host (e.g. VLAN user when the network is VLAN), the path searching/setup portion monitors a path (link) usage state of another host as the traffic state of the network. The path searching/setup portion selects a path not used by other hosts by preference and determines it as the storage data path of the single host. Thus, it becomes possible to determine the storage data path of the single host in which the storage data transfer performance does not deteriorate.

Also, in the present invention according to the above-mentioned invention, the virtual storage manager/controller may notify the selected storage space and the determined storage data path to the host. Thus, it becomes possible to assign the storage space corresponding to the usage state of the storage device and the storage data path corresponding to the traffic state to the host.

Also, in the present invention according to the above-mentioned invention, the path searching/setup portion may prestructure a plurality of spanning trees between the host and the storage device, and may select the storage data path from among the spanning trees based on a number of iSCSI sessions or hops of the spanning trees upon a storage capacity request from the host.

Namely, the path searching/setup portion prestructures a plurality of spanning trees between the host and storage device. The path searching/setup portion selects the storage data path, in which the storage data transfer performance does not deteriorate, from among the spanning trees based on a number of iSCSI sessions or hops of the spanning trees between the host and the storage device upon a storage capacity request from the host.

Also, in the present invention according to the above-mentioned invention, the path searching/setup portion may notify the determined storage data path to the host. Thus, it becomes possible for the host 200 to transmit/receive the storage data to/from the storage space through the path set up in each network device 400.

Also, in the present invention according to the above-mentioned invention, when a plurality of storage spaces are selected, the path searching/setup portion may select a storage data path by which a deviation of a delay time of the storage data paths connecting the host to the selected storage space is reduced. Thus, it becomes possible to equalize data transfer delay times of the storage data paths connecting the storage spaces (storage devices) to the host.

Also, in the present invention according to the above-mentioned invention, the storage data path may be determined by a VLAN or an MPLS system. Thus, the storage data path can be made a virtual path.

Also, in the present invention according to the above-mentioned invention, the network device may comprise an IP network device. Thus, it becomes possible to structure an IP storage network.

Also, in the present invention according to the above-mentioned invention, when a fault occurs or a fault occurrence is predicted respectively in the storage device and the network device, the path searching/setup portion may search and determine, based on the storage usage state and the traffic state, a substitute storage for a storage space in the storage device in which the fault occurs or the fault occurrence is predicted, or may search and determine a substitute path for a storage data path related to the network device in which the fault occurs or the fault occurrence is predicted.

Namely, when a fault occurs or a fault occurrence is predicted in the storage device, the path searching/setup portion may search and determine, based on the storage usage state and the traffic state, a substitute storage for a storage space in the storage device in which the fault occurs or the fault occurrence is predicted. Also, when a fault occurs or a fault occurrence is predicted in the network device, the path searching/setup portion may search and determine, based on the storage usage state and the traffic state, a substitute path for a storage data path related to the network device in which the fault occurs or the fault occurrence is predicted.

Thus, when there is a possibility that a fault occurs or a fault occurrence is predicted in the storage device and the network device, it becomes possible to switch over the storage space and the storage data path to a substitute storage space and storage data path respectively at a high speed.

It is to be noted that in the present invention various kinds of conventional technologies can be applied as means of detecting or predicting a fault occurrence in the storage device and the network device.

Also, in the present invention according to the above-mentioned invention, the host may be provided with a virtualization mapper providing a storage space allocating request to the storage management server, and associating a storage space replied to the storage space allocating request with a virtual storage, and a path information setup portion setting up path information of the storage data path in storage data so that the storage data may be transmitted through the storage data path replied to the storage space allocating request.

In FIG. 1, the host 200 is provided with a virtualization mapper 31 and a path information setup portion (VLAN information setup portion 33 in FIG. 1). The virtualization mapper 31 transmits a storage space allocating request which requests the storage from the storage management server 100. This storage space allocating request includes e.g. a disk capacity assignment request upon the initial setup, an additional capacity assignment request during operation, a capacity assignment request upon fault occurrence, or the like required by the host. Furthermore, the storage space allocating request can also include a path setup request and its priority.

For the storage space allocating request, a storage space (e.g. address information of logical volume and information of used space) and storage data path (e.g. path designated by path information such as VLAN ID) are replied from the storage management server 100. The virtualization mapper 31 associates the storage space (logical volume) with the virtual space (virtual volume). The path information setup portion 33 sets up the path information (e.g. VLAN tag) of the storage data path in the storage data so as to transfer the storage data through the storage data path.

The above-mentioned associating function is regarded as a virtualization setup function of the storage management server for structuring a virtualized storage area network concerning the host. Namely, it becomes possible for the storage management server to set up (notify), to the host, a virtualization information of the logical volume (or actual volume) determined to be used for the virtual volume according to the request from the host, and for the host to access the virtual volume (storage device distributed and arranged over the network) based on the virtualization information.

It is to be noted that the above-mentioned path information may comprise a tag. Namely, by assigning e.g. a VLAN tag to the storage data, the storage data are transferred through the storage data path designated by the tag.

Also, the present invention according to the above-mentioned invention further comprises a SCSI controller converting the storage data into SCSI data. This SCSI controller converts the SCSI data into an iSCSI packet, and sets up an iSCSI session for transferring the iSCSI on an IP network. Thus, the virtualization mapper can associate the iSCSI session with the virtual storage.

In FIG. 1, the host 200 is further provided with a SCSI controller 32, which sets up iSCSI sessions 700_1 and 700_2 on the storage data path (e.g. VLAN network 660). The virtualization mapper 31 associates the storage space (logical volume) with the iSCSI session by e.g. a logical volume information table. Thus, it becomes possible to transmit the storage data through the iSCSI session. As mentioned above, it becomes possible to structure the virtualized storage network on the IP network, and to transmit the storage data by using the iSCSI session.

Also, the present invention according to the above-mentioned invention further comprises a RAID controller realizing a RAID function between a plurality of logical storage spaces.

Namely, in FIG. 1, the host 200 is further provided with a RAID controller 34, which enables a RAID function of controlling a redundancy disk configuration between a plurality of logical storage spaces (e.g. disks) used for the virtual storage (virtual volume).

Namely, it becomes possible to assign disks within a plurality of storage devices distributed over the network as redundancy disks to the virtual volume.

Furthermore, in the present invention according to the above-mentioned invention, when a fault occurs in the storage device, the RAID controller may notify the fault to the storage management server. By this fault notification, the storage management server can perform a function of assigning a substitute storage space for a storage space in which a fault has occurred.

Furthermore, in the present invention, in a storage management method of a storage management system comprising one or more network devices, one or more hosts and storage devices connected with storage data paths (sessions/connections) on a network composed of the network devices, and a storage management server connected to the network devices, the hosts, and the storage devices, the storage management server executes: a first step of managing a storage usage state of each storage device; a second step of managing a traffic state of the network by monitoring each network device; and a third step of determining the storage data path to be set up in the network device based on the storage usage state and the traffic state.

As described above, according to the storage management system of the present invention, the storage management server manages the storage (disk) state and the network state, determines the disk or the storage device used for the virtual volume according to the storage (disk) assignment request from the host, and then determines the storage data path between the host and the storage immediately based on e.g. used disk position information.

Namely, automatic and high-speed virtualization processing and network setup processing can be achieved. Thus, an immediate setup compared with a manual setup by a manager in the conventional technology can be performed, so that a management cost can be reduced.

Also, according to the storage management system of the present invention, the deterioration of the network transfer performance caused by an introduction of the storage virtualization technique can be avoided e.g. on the IP network. Thus, the storage virtualization by the IP-SAN with an inexpensive IP network can be realized with a lower facility cost compared with that of the conventional FC-based SAN without deterioration of the network transfer performance.

BRIEF DESCRIPTION OF THE DRAWINGS

The above and other objects and advantages of the invention will be apparent upon consideration of the following detailed description, taken in conjunction with the accompanying drawings, in which the reference numerals refer to like parts throughout and in which:

FIG. 3 is a diagram showing an example of a storage state management table included in a storage state manager in a storage management server of a storage management system according to the present invention;

FIG. 5 is a diagram showing an example of a virtual volume/logical volume correspondence management table included in a virtual storage manager/controller in a storage management server of a storage management system according to the present invention;

FIG. 6 is a diagram showing an example of a network state management table included in a network state manager in a storage management server of a storage management system according to the present invention;

FIG. 8 is a diagram showing an example of a virtual volume/logical volume correspondence table included in a virtualization mapper of a host in a storage management system according to the present invention;

FIG. 9 is a diagram showing an example of a logical volume information table included in a virtualization mapper of a host in a storage management system according to the present invention;

DESCRIPTION OF THE EMBODIMENTS

Embodiment of Arrangement: Storage Management Server 100

Figure 2:
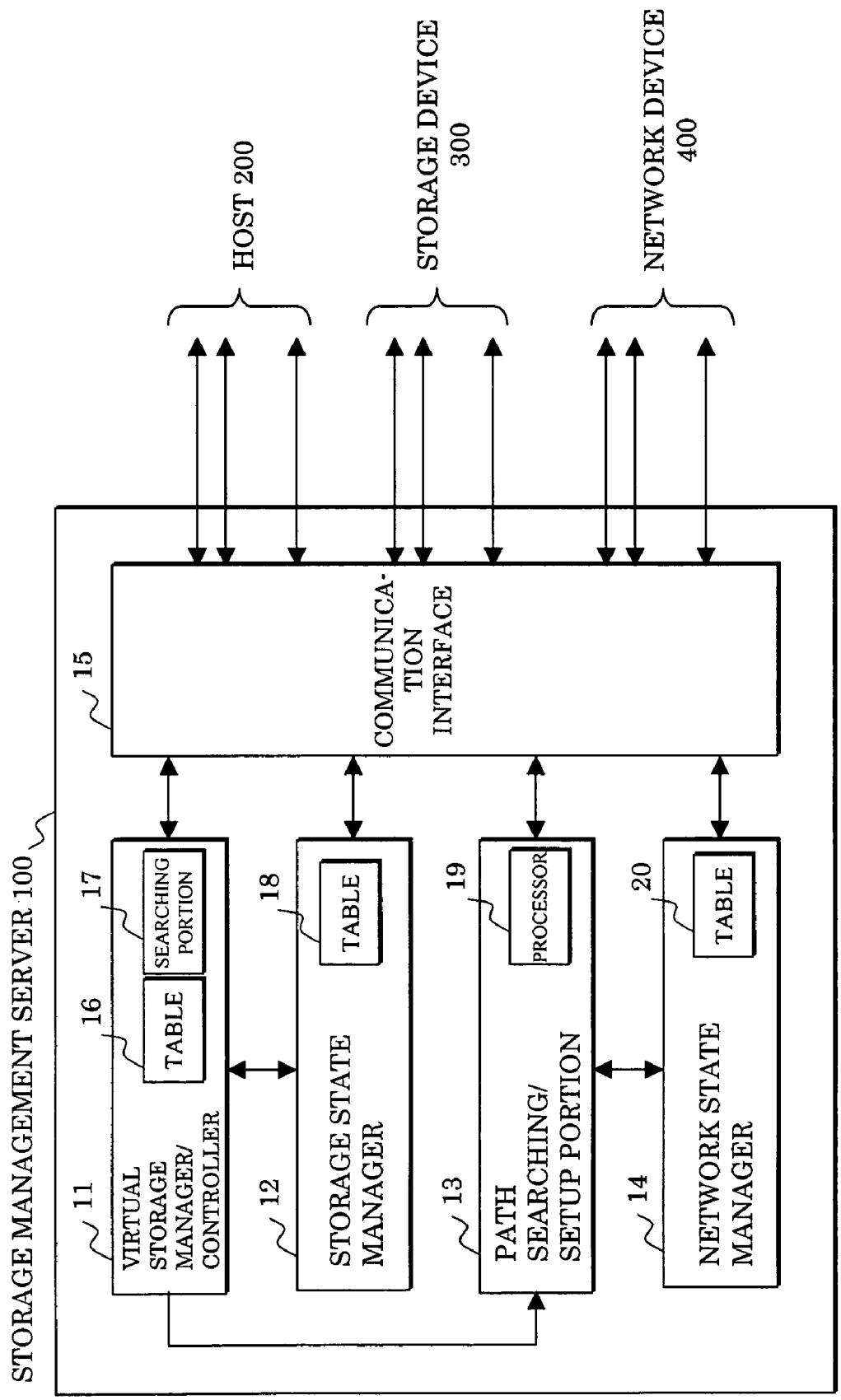
FIG. 2 is a block diagram showing an embodiment of an arrangement of a storage management server in a storage management system according to the present invention.

FIG. 2 shows an embodiment of an arrangement of the server storage management server 100 in the storage management system according to the present invention. This storage management server 100 is provided with functional portions of the virtual storage manager/controller 11, the storage state manager 12, the path searching/setup portion 13, the network state manager 14, and a communication interface 15.

The virtual storage manager/controller 11 is provided with a virtual volume/logical volume correspondence management table 16 and a disk searching portion 17. The storage state manager 12 is provided with a storage state management table 18. The path searching/setup portion 13 is provided with a path selection processor 19. The network state manager 14 is provided with a network state management table 20.

Operation Example of Each Functional Portion of Storage Management Server 100

Hereinafter, basic operation examples of the above-mentioned functional portion will be described.

(1) Storage State Manager 12

The storage state manager 12 manages the state of the storage device 300 connected to the IP network 640 and a logical volume (Local Unit Number; hereinafter, occasionally abbreviated as LUN) within the storage device 300 by using the storage state management table 18.

FIG. 3 shows an embodiment of the storage state management table 18 included in the storage state manager 12. This table 18 is composed of a storage device name 18*a*, a storage device IP address 18*b*, an LUN ID 18*c*, an LUN capacity 18*d*, and an LUN available space 18*e*.

For example, the storage device name 18*a* comprising "storage 300_1", the storage device IP address 18*b* comprising "20.0.10.1", the LUN ID 18*c* comprising "LUN 1" and "LUN 2", their LUN capacity 18*d* comprising "50M" and "200M", and each LUN available space 18*e* comprising "20M" and "200M" are registered in the table 18 as an entry of the storage device 300_1. It is to be noted that a utilization or the like may be substituted for the LUN available space 18*e*.

As means for collecting the state of the storage device 300, e.g. the following means (1)-(3) may be used.

Means (1): The storage state manager 12 periodically acquires MIB (Management Information Base) information managed by the storage device 300 by using an SNMP (Simple Network Management Protocol). The MIB information has storage management information prescribed by an SNIA-J (Storage Networking Industry Association Japan Forum), and the IP address, the available space, and the like are stored therein as the state information within the storage device 300.

Means (2): The storage state manager 12 updates and manages the capacity of the individual logical volume every time e.g. a virtual volume assignment request or a fault notification is received from a host.

Means (3): Also, when e.g. the storage device 300_2 is newly added to or removed from the network, the storage state manager 12 respectively registers the addition/removal of an entry 18_2 (see FIG. 3) of the storage device 300_2 in the storage state management table 18.

(2) Virtual Storage Manager/Controller 11

Figure 4:
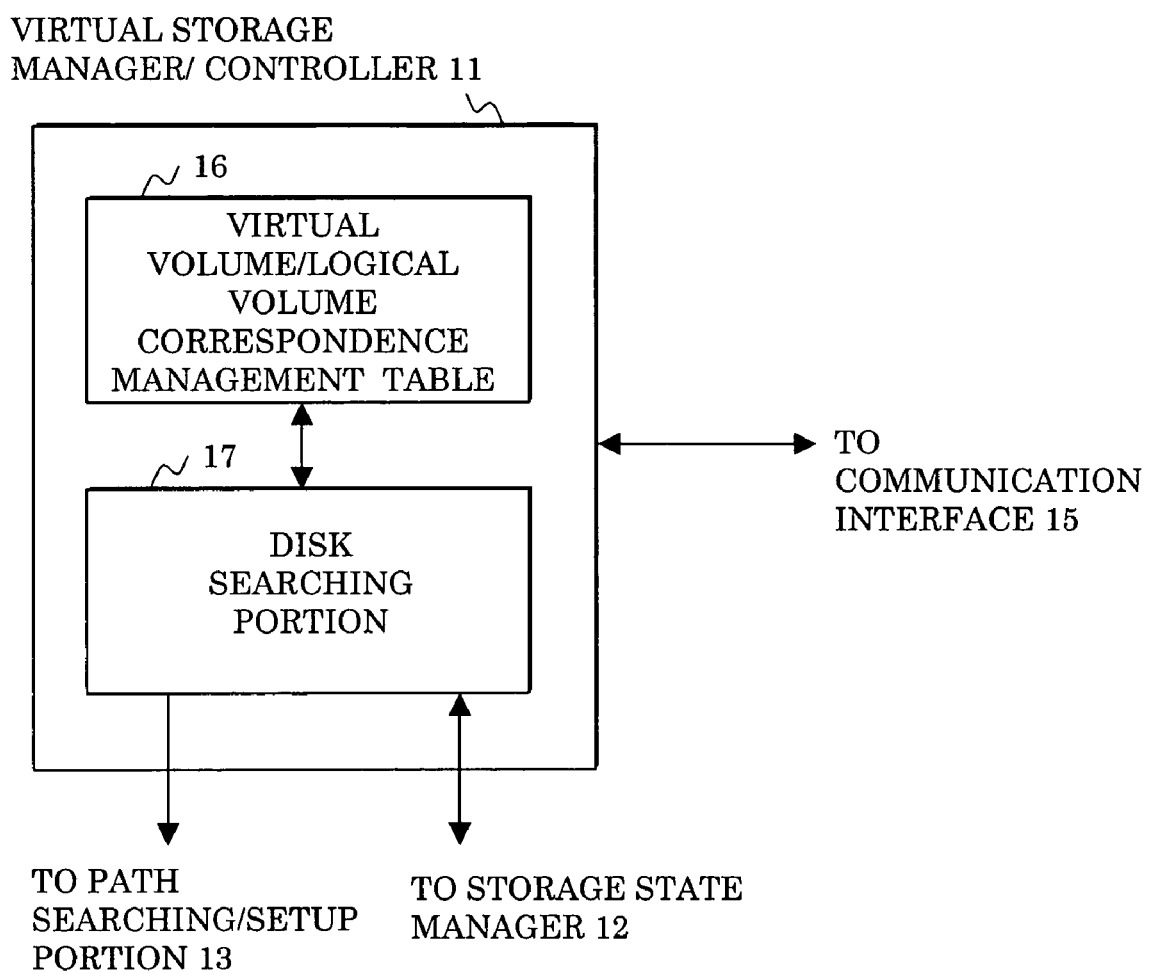
FIG. 4 is a block diagram showing an embodiment of an arrangement of a virtual storage manager/controller in a storage management server of a storage management system according to the present invention.

FIG. 4 shows in more detail the virtual storage manager/controller 11 shown in FIG. 2. This virtual storage manager/controller 11 is composed of the virtual volume/logical volume correspondence management table 16 and the disk searching portion 17.

FIG. 5 shows an embodiment of the virtual volume/logical volume correspondence management table 16 shown in FIG. 4. This table 16 is composed of host information 16*a*, virtual volume information 16*b*, RAID information 16*c*, and logical volume information 16*d*. The information 16*a*-16*d* respectively include a host name 16*a*1 and a host IP address 16*a*2, a virtual volume name 16*b*1 and a virtual volume capacity 16*b*2, a RAID level 16*c*1, and a storage device IP address 16*d*1 and an LUN identifier (hereinafter, identifier is occasionally abbreviated as ID) 16*d*2.

Figure 1:
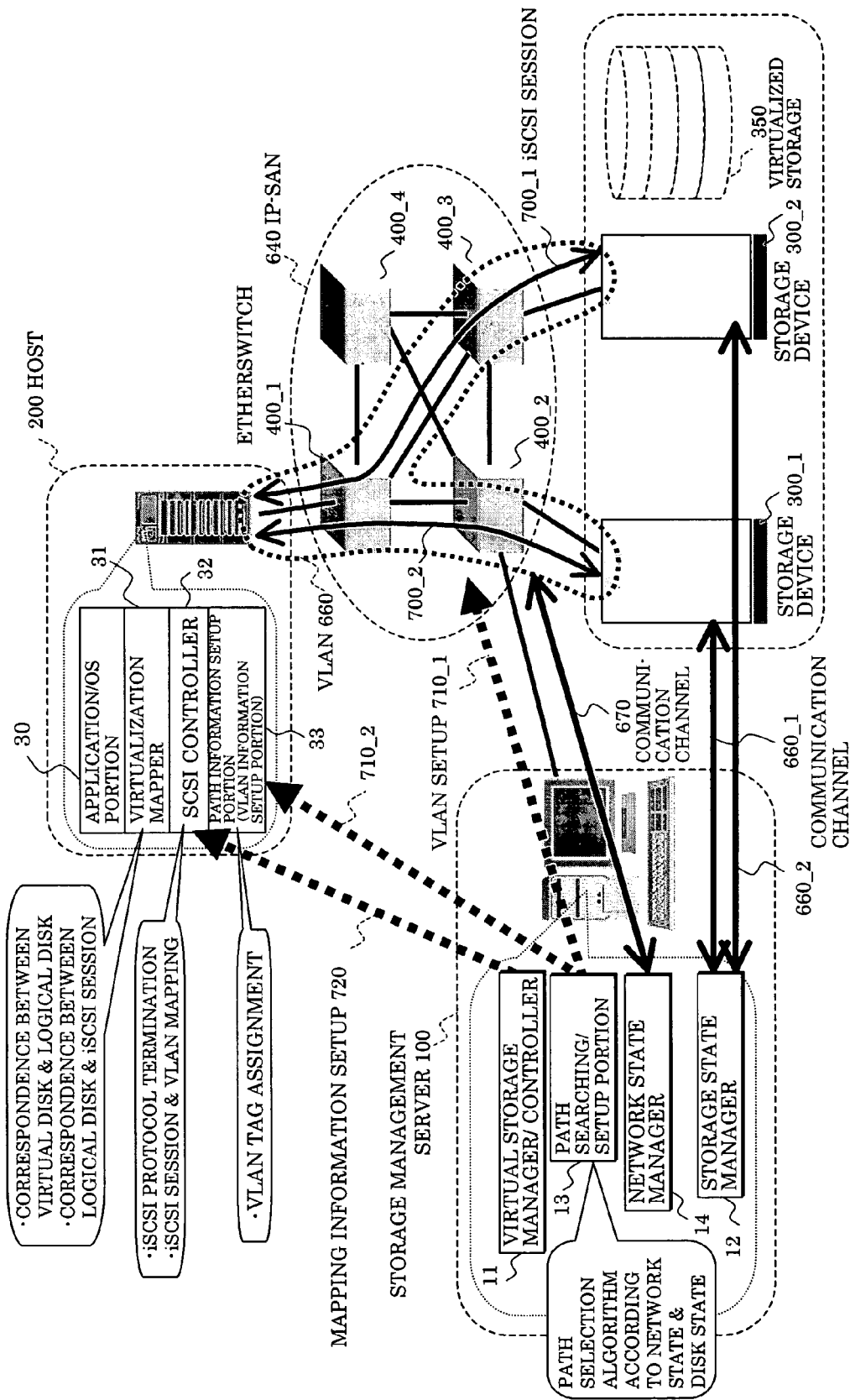
FIG. 1 is a block diagram showing an operation principle of a storage management system and method according to the present invention.

In operation, the virtual storage manager/controller 11 manages a correspondence between the virtual volume and the logical volume (=logical unit) composing the virtual volume by using the table 16 with respect to the host 200 (see FIG. 1) connected to the network.

For example, when a virtual volume assignment request 810 is received from the host 200 through the communication interface 15, the disk searching portion 17 in the virtual storage manager/controller 11 refers to the storage state management table 18 included in the storage state manager 12, searches and selects the logical volume suitable for the virtual volume (disk) capacity requested by the host, based on the information such as the LUN available space 18e and the utilization of the logical volume of each storage device, and registers the logical volume in the table 16.

Similarly, when a fault occurs in the disk (storage device) already operated, the disk searching portion 17 searches and selects a substitutable logical volume for the virtual volume in which a fault has occurred indicated in a fault notification 910 received from the host 200, and registers the acceptable logical volume in the table 16.

With respect to a logic of a disk selection, a method of sequentially selecting the logical volume with e.g. a larger available space until the requested capacity is satisfied can be adopted.

In the table 16 (see FIG. 5), as the entry of e.g. the host 200 selected by the disk searching portion 17, the host name comprising "host 200", the host IP address comprising "10.0.0.101", the virtual volume name comprising "volume 1", the virtual volume (LUN) capacity comprising "1 G byte", the RAID level comprising "RAID 1", the storage device IP address comprising "20.0.10.1", "20.0.10.1", and "30.0.10.1", the LUN ID comprising "LUN 1"-"LUN 3" respectively corresponding to their storage device IP addresses 16d1 are registered.

Also, when the logical volume used is determined, the virtual storage manager/controller 11 transfers position information (e.g. IP address) of the storage device 300 including the logical volume to the path searching/setup portion 13.

(3) Path Searching/Setup Portion 13

The path searching/setup portion 13 searches a path between the host 200 and storage device 300 based on the position information (e.g. IP address) of the storage device 300 from the storage state manager 12. A path searching method in the path searching/setup portion 13 will be described later.

(4) Network State Manager 14

The network state manager 14 is provided with a network state management table 20. The network state manager 14 periodically accesses the network devices (nodes) within the network, and collects and holds the traffic state per link for every network device to be managed.

FIG. 6 shows an embodiment of the network state management table 20. This table 20 is composed of network states such as a network device (node) ID 20a, a node IP address 20b, a link ID 20c, the number of iSCSI sessions 20d, and a used bandwidth of link 20e.

The table 20 holds, as the entry of e.g. the network device 400_1, the ID 20a="SW400_1", the IP address 20b="10.0.100.101", the link ID 20c="link 01", the number of iSCSI sessions 20d="1", and the used bandwidth of link 20e="20M".

Collection Method of Network States

As the collection method of network states, the following methods (1)-(3) are exemplified:

Method (1): A method of acquiring the MIB information held by the network device (node) by using the SNMP with respect to the used bandwidth of a link;

Method (2): A method of receiving the virtual volume assignment request from the user (host), subtracting an available bandwidth of the used link every time a path is determined, and managing the available bandwidth of link at present;

Method (3): A method of managing the traffic state by updating the number of iSCSI sessions of the link at the time when the VLAN path is determined, since the link between the host and the storage through which the iSCSI session passes is determined at that time, with respect to the number of iSCSI sessions.

(5) Communication Interface 15

The communication interface 15 interfaces signals transmitted/received between the above-mentioned virtual storage manager/controller 11, the storage state manager 12, the path searching/setup portion 13, the network state manager 14, and the host 200, the storage device 300, the network device 400.

Embodiment of Arrangement: Host 200

Figure 7:
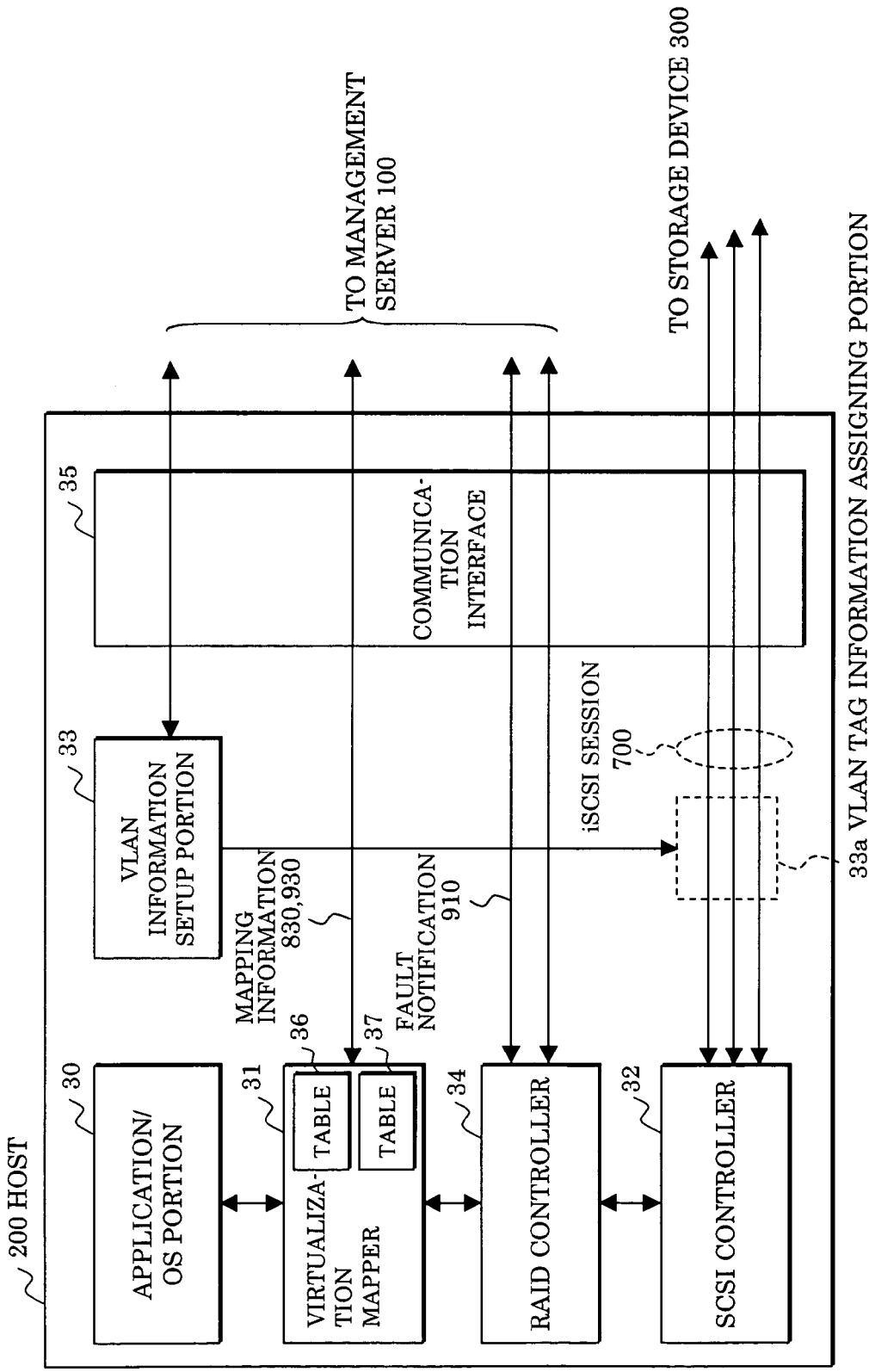
FIG. 7 is a block diagram showing an embodiment of an arrangement of a host in a storage management system according to the present invention.

FIG. 7 shows an embodiment of an arrangement of the host 200 in the storage management system according to the present invention. The functional portions included in the host 200 are the application/OS portion 30, the virtualization mapper 31, the SCSI controller 32, the VLAN information setup portion 33, a RAID controller 34, and a communication interface 35.

Among the above-mentioned functional portions, the virtualization mapper 31 is provided with a virtual volume/logical volume correspondence table 36 and a logical volume information table 37. Also, a VLAN tag information assigning portion 33a is added to the VLAN information setup portion 33.

Operation of Each Functional Portion of Host 200

Hereinafter, the operation of the main functional portions mentioned above will be described.

(1) Virtualization Mapper 31

The virtualization mapper 31 associates the virtual volume with the logical volume, and the logical volume with the iSCSI session based on virtualization information notified by the storage management server 100 such as virtualized storage mapping information 830 or 930. The correspondence between the virtual volume and the logical volume is shown in the virtual volume/logical volume correspondence table 36.

FIG. 8 shows an embodiment of the virtual volume/logical volume correspondence table 36, which is composed of a virtual volume name 36a, virtual volume sector information 36b, a logical volume name 36c, and logical volume sector information 36d.

In the table 36, the virtual volume name 36a="Volume#1" is associated with the logical volume name 36c=logical volumes #1-#3.

The correspondence between the logical volume and the iSCSI session requires the logical volume information table 37 according to the present invention.

FIG. 9 shows the logical volume information table 37, which is composed of a logical volume name 37a, a SCSI port ID 37b, and an iSCSI session ID 37c.

Namely, in the table 37, the SCSI port ID 37b="Port#1" used by the logical volume and the iSCSI session ID 37c="#1" corresponding thereto are associated with the logical volume name 37a="LUN#1".

These elements are determined in the process of establishing the iSCSI session based on the address of the logical volume used as the virtual volume notified from the storage management server 100.

(2) SCSI Controller 32

The SCSI controller 32 converts actual data into storage data (SCSI data), and establishes and manages the iSCSI session for transferring the SCSI data on the network.

(3) VLAN Information Setup Portion 33

The VLAN information setup portion 33 has a function of assigning the VLAN ID information such as the VLAN ID and priority information notified from the storage management server 100 to an Ethernet frame through the VLAN tag information assigning portion 33a upon transferring the actual storage data.

(4) RAID Controller 34

The RAID controller 34 has a function of realizing the RAID function between a plurality of logical volumes used for the virtual volume. Namely, the RAID controller 34 assigns data received from the virtualization mapper 31 to each logical volume according to a RAID algorithm of its own, and transfers the data to the SCSI port corresponding to each logical volume. Reversely, the RAID controller 34 combines the data received from each SCSI port according to the RAID algorithm to be transferred to the virtualization mapper 31.

Also, the RAID controller 34 performs the fault notification 910 to the storage management server 100 upon disk fault occurrence. The fault notification 910 includes the ID information of the logical volume in which a fault has occurred, and is notified to the storage management server 100 by the normal TCP/IP communication.

Operation Embodiment: Virtualization Setup (Virtualization Volume Preparation)

In case of the virtualization setup (virtualized storage (volume) preparation) between the host and the storage device, there are (1) setup at the time of host connection, and (2) setup at the time of storage (volume) fault occurrence. Hereinafter, embodiments (1) and (2) of the virtualization setup operation corresponding to setup (1) at the time of the host connection and setup (2) at the time of the storage fault occurrence respectively will be described.

Figure 10:
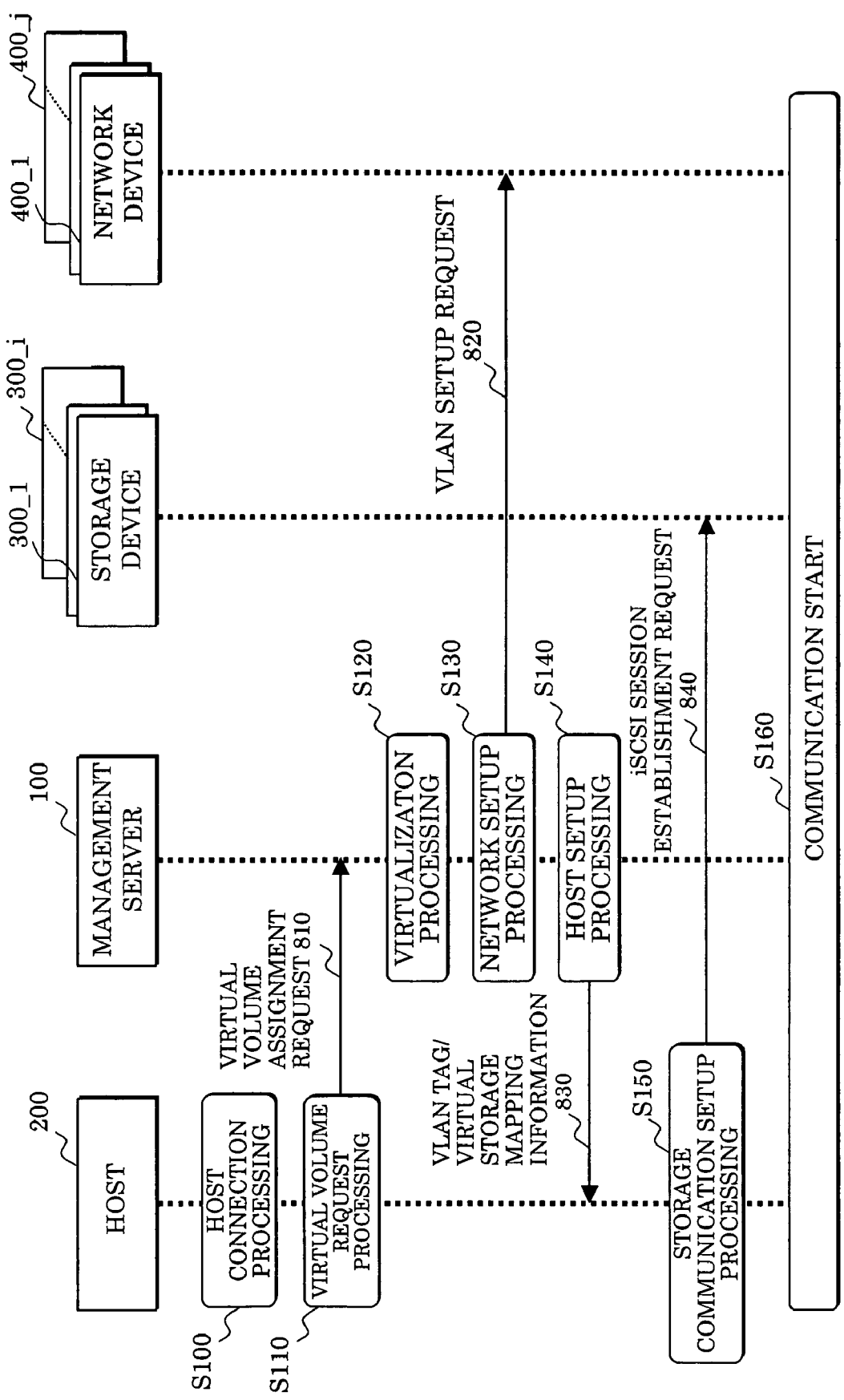
FIG. 10 is a sequence diagram showing an operation embodiment (1) (virtualization setup operation procedure at a time of a new host connection) of a storage management system according to the present invention.

Operation Embodiment (1): Operation Procedure of Virtualization Setup at the Time of Host Connection FIG. 10 shows the operation embodiment (1) of the storage management system according to the present invention. In this embodiment (1), an operation procedure example of virtualization setup at the time of an initial setup of the host 200, i.e. at the time of connecting the host 200 to the IP-SAN network 640 (see FIG. 1) is shown. This operation embodiment (1) will now be described.

Step S100: The host 200 is connected to the network 640, and executes connection processing.

Step S110: The host 200 sets up the virtual disk capacity, the RAID level, a transfer priority, the IP address of its own, etc. from e.g. a setup file of its own, a WEB input menu, etc. and transmits the virtual volume assignment request (virtualization setup processing request) 810 including the above-mentioned information to the storage management server 100.

Step S120 (virtualization processing): In the storage management server 100, the virtual storage manager/controller 11 receives the virtual volume assignment request 810 and executes the virtualization processing of selecting a logical volume to be used and a VLAN path.

Figure 11:
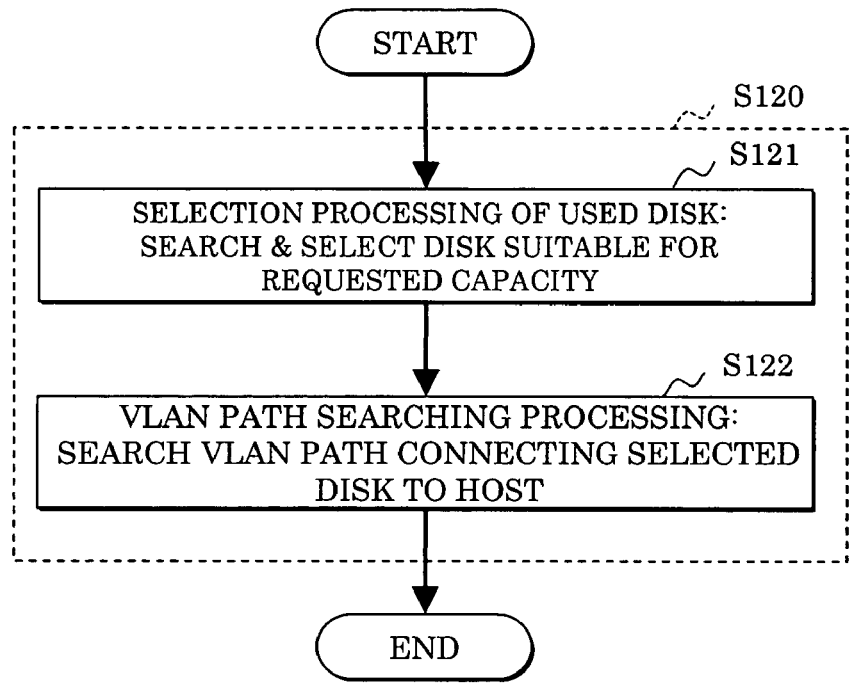
FIG. 11 is a flowchart showing a virtualization processing procedure example (1) (at a time of a new host connection) of a virtual storage manager/controller included in a storage management server in a storage management system according to the present invention.

FIG. 11 shows in more detail the virtualization processing of step S120. This processing will now be described.

Step S121 (selection processing of used disk): In the virtual storage manager/controller 11, the disk searching portion 17 (see FIG. 3) searches a disk having an available space requested by the virtual volume assignment request 810 from among the storage device 300, referring to the storage state management table 18, and selects a disk with a larger available space (logical volume), for example, from among the searched disks.

Step S122 (VLAN path searching processing): The path searching/setup portion 13 (see FIG. 2) searches a VLAN path connecting the selected disk (storage device) to the host 200, referring to the network state management table 20 (see FIG. 6) of the network state manager 14. The VLAN path searching processing will be described later in more detail.

Step S130 (network setup processing): In FIG. 10, the path searching/setup portion 13 of the storage management server 100 transmits a VLAN setup request 820 including the VLAN information to each network device 400 related to the VLAN path determined by the above-mentioned VLAN path searching processing. Thus, the VLAN path between the selected disk (storage device) and the host 200 is set up.

Step S140 (host setup processing): Furthermore, the path searching/setup portion 13 transmits the VLAN tag/virtual storage mapping information 830 including the logical volume information, the VLAN ID, and the like to the host 200 through the communication interface 15 (see FIG. 2).

Step S150: In the host 200, the virtualization mapper 31 receives the mapping information 830 and associates the virtual volume with the logical volume, and the logical volume with the iSCSI session, in order to establish an iSCSI session 700 for the logical volume included in the information 830. The SCSI controller 32 provides an iSCSI session establishment request 840 to the storage device 300 to establish the iSCSI session 700 (see FIG. 1).

Step S160: Thus, a virtualization setup sequence is completed so that it becomes possible for the application/OS portion 30 of the host 200 to read and write the virtual volume.

Figure 12:
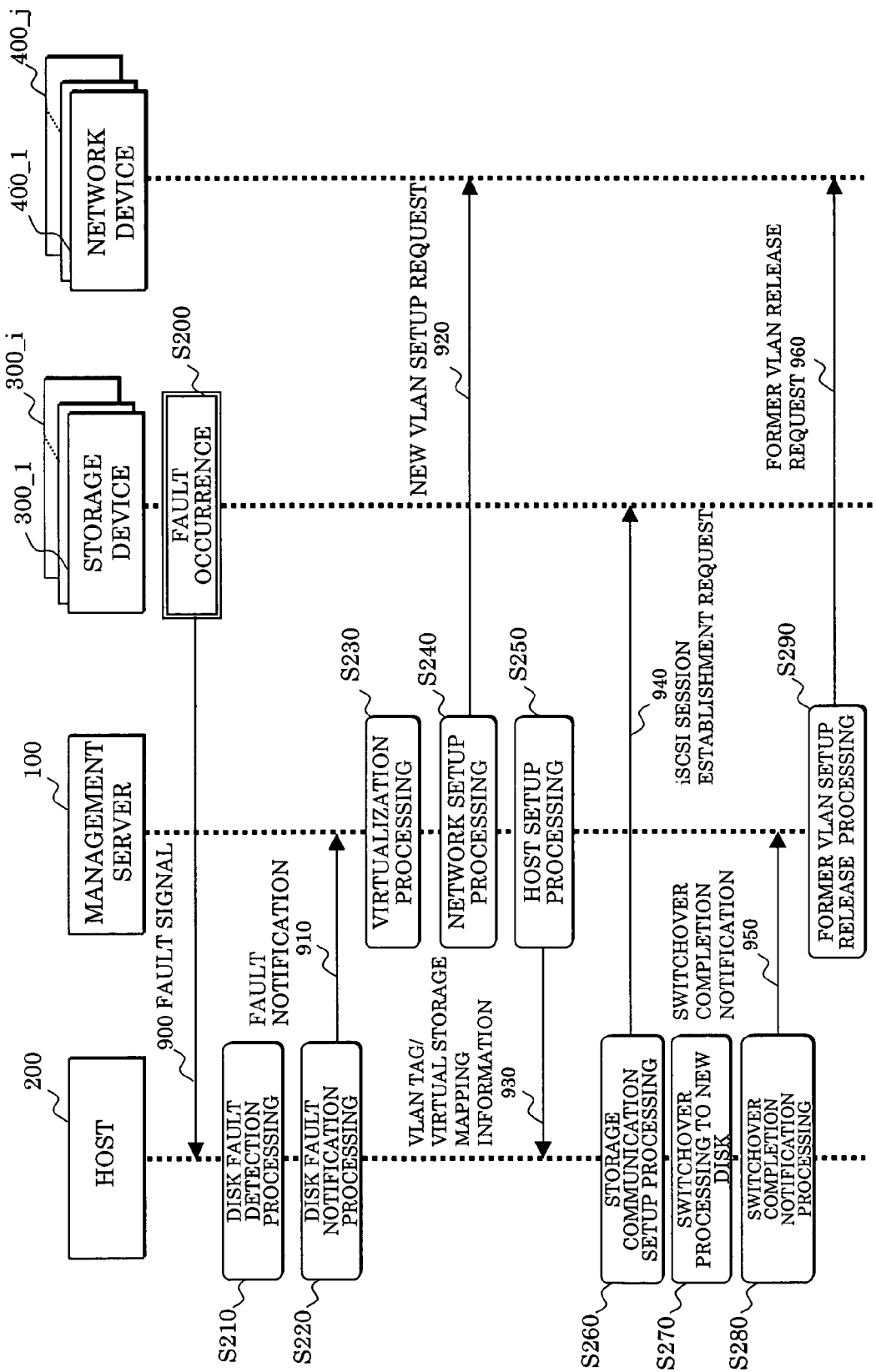
FIG. 12 is a sequence diagram showing an operation embodiment (2) (virtualization setup operation procedure at a time of a storage fault occurrence) of a storage management system according to the present invention.

Operation Embodiment (2): Operation Procedure of Virtualization Setup at the Time of Storage Fault Occurrence FIG. 12 shows an operation embodiment (2) of the storage management server according to the present invention. This embodiment (2) shows an operation procedure of searching a substitute volume and of setting up virtualization when a fault occurs in the logical volume (storage device) composing the virtual volume while the host 200 uses the virtual volume or when a fault is predicted. This operation procedure will now be described.

It is to be noted that in this embodiment (2), an operation by a RAID is supposed. RAID such as "RAID 1", "RAID 0+1", or "RAID 5", respectively performs a recovery operation for a disk fault by itself. Therefore, no substitute volume is supposed to be required. However, a read/write speed of the disk or the like will be decreased due to a load of a recovery operation itself by the RAID.

Accordingly, even upon the RAID operation, an immediate exchange of the fault disk and a recovery are indispensable. By performing virtualization by the substitute volume, it becomes possible to exchange a fault disk without stopping a system.

For example, when mirroring (copy function between a plurality of volumes) is performed in the "RAID 1", "RAID 0+1", or the like, the virtualization setup is performed by the substitute new logical volume when a fault is detected. The former data are copied to the new logical volume, and an access switchover to the new logical volume is further performed in the host 200, whereby the virtualization setup processing is completed.

Also, with respect to a distribution method of data by a parity data addition such as "RAID 5", since it is impossible to back up data after a fault occurs, a fault of the logical volume is predicted. When a symptom of a fault is detected, the same processing as the case of the "RAID 1" and "RAID 0+1" is performed after performing the virtualization setup by the substitute volume.

The virtualization setup sequence by a prediction can be applied to the cases of the "RAID 1" and the "RAID 0+1". Also, with respect to the fault prediction of the disk, the conventional technology of a symptom monitoring function or the like can be used.

Step S200: A disk fault occurs in the storage device 300, and a fault signal 900 is notified to the host 200.

Step S210: The host 200 detects the fault signal 900. The RAID controller 34 of the host 200, for example, can detect a fault occurrence by the start of the recovery operation since e.g. the RAID function itself performs the inherent recovery operation upon disk fault.

Step S220: The host 200 provides the fault notification 910 including the information of the logical volume in which the fault has occurred to the storage management server 100. It is to be noted that as notification means, the SNMP (Simple Network Management Protocol), a COPS (Common Open Policy Service), a message of a TCP/IP communication, or the like may be used.

Step S230 (virtualization processing): In the storage management server 100, the virtual storage manager/controller 11 receives the fault notification 910, searches and selects the substitute logical volume for the logical volume in which the fault has occurred, and performs the virtualization processing of selecting a VLAN path.

Figure 13:
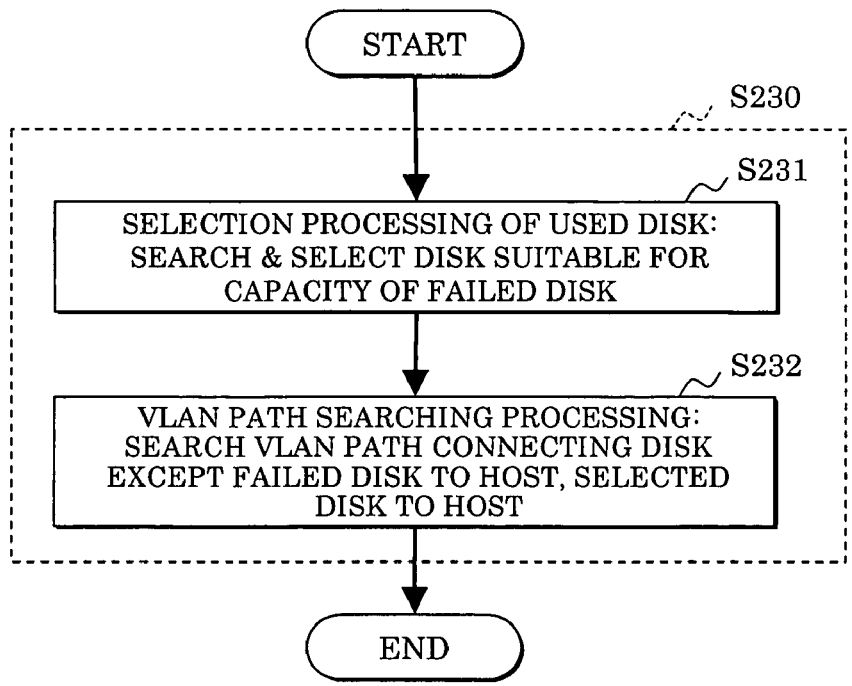
FIG. 13 is a flowchart showing a virtualization processing procedure example (2) (at a time of a storage fault occurrence) of a virtual storage manager/controller included in a storage management server in a storage management system according to the present invention.

FIG. 13 shows in more detail the virtualization processing at step S230. This processing will now be described.

Step S231 (selection processing of used disk): The virtual storage manager/controller 11 searches and selects a disk suitable for a capacity of a failed disk (logical volume).

Step S232 (VLAN path searching processing): The virtual storage manager/controller 11 searches the VLAN paths connecting a disk except the disk in which the fault has occurred to the host 200 and connecting a selected disk to the host 200. The VLAN path searching processing is the same as that at step S122 of the embodiment (1), and will be described later in more detail.

Step S240: In FIG. 12, the path searching/setup portion 13 of the storage management server 100 selects a suitable VLAN path from among the VLAN paths searched. The path searching/setup portion 13 provides a new VLAN setup request 920 requesting the selected VLAN path setup to the network device 400 related to the new VLAN path, and sets up the VLAN paths connecting the selected disk (logical volume) to the host 200 and connecting a disk in which a fault has not occurred to the host 200.

Step S250 (host setup processing): The storage management server 100 provides the VLAN tag/virtual storage mapping information 930 including the set up VLAN path information (e.g. tag) and the selected logical volume to the host 200.

Step S260 (storage communication setup processing): In the host 200, the virtualization mapper 31 receives the mapping information 930, and associates the logical volume with the virtualization volume (see FIG. 8) based on the information 930, and logical volume with the iSCSI session (see FIG. 9). The SCSI controller 32 provides an iSCSI session establishment request 940 requesting an establishment of iSCSI session associated to the storage device 300 to establish the iSCSI session.

Steps S270-S290: After performing an access switchover to the selected logical volume (substitute volume), the VLAN information setup portion 33 transmits a switchover completion notification 950 to the storage management server 100. The storage management server 100 releases the VLAN used before a fault occurrence for the network device 400.

Thus, the virtualized storage is composed in which the logical volume where a fault has occurred is switched over to the substitute logical volume.

VLAN Path Searching Processing

Hereinafter, the VLAN path searching processing described at step S122 (see FIG. 11) of the embodiment (1) and at step S232 (see FIG. 13) of the embodiment (2) will be described in more detail.

As a method of setting up a path between the host and the storage device, i.e. a method of structuring a virtual network, there are methods (1), (2), and the like as follows;

Path Setup Method (1)

This is a path searching method of connecting the host to the storage device by using a VLAN (virtual LAN) technology. A VLAN is based on a transfer technology in a network layer 2, or means for structuring a logical virtual network on the same network by setting up a path per user, which is generally used at present. A combination of host and storage device is called a user SAN, and the VLAN path is determined per user SAN.

Path Setup Method (2)

This is a path searching method of connecting the host to the storage device by using a technology except the VLAN technology. It is also possible to structure a virtual network per user SAN by using a label path technology of an MPLS (Multi-protocol Label Switching) that is a technology of layer 3, and a virtual connection (VC) and a virtual path (VP) of an ATM (Asynchronous Transfer Mode).

In both methods (1) and (2), it is important to determine a path suitable for a storage transfer. Methods (1)-(3) of selecting a VLAN path suitable for the storage transfer based on the above-mentioned path setup method (1), i.e. the VLAN path searching processing will now be described.

Path Selection Method (1)

This is a method of determining a path based on an available bandwidth reserved within a transmission link of the network. Namely, the storage management server 100 allocates a link bandwidth every time the virtual volume and the VLAN are set up in the host 200, manages the remaining bandwidth, excludes links with more available bandwidth in the VLAN path searching processing, and executes a searching of the VLAN path, whereby the bandwidth of the network is efficiently used.

Path Selection Method (2)

This is a method of determining a path based on a storage traffic within the transmission link of the network. Namely, links with higher storage traffic are excluded based on the storage traffic within the links, the VLAN path is searched, and the transfer performance deterioration of the storage data is avoided. In order to estimate the storage traffic within the link, the number of iSCSI connections within the link is taken into account. Namely, the link where the number of iSCSI sessions passing through the link is larger is regarded as a link with a larger transfer amount of the storage traffic.

Path Selection Method (3)

This is a method of determining a path based on a distance between the host and the storage device. As indicated in the embodiment (2), if the distance between the host and the logical volume (storage device) varies from one logical volume to another logical volume upon performing the RAID function all over the network, there is a possibility that a transfer performance deterioration occurs due to varied delays upon e.g. data reading processing.

Accordingly, it is desirable that the delay times between the host and the logical volume be as short as possible, or equal with each other. Therefore, the number of hops between the host and the storage device is noticed. A path in which the number of hops between the host and the storage device is close to the average, i.e. in which a deviation is reduced is selected.

Embodiment of Path Setup Selection Using a Plurality of Spanning Trees

Hereinafter, path setup selection embodiments (1) and (2) will be described. In the path setup selection embodiment (1), a plurality of spanning trees (hereinafter, occasionally abbreviated as ST) are prestructured, and a single path within a plurality of trees is selected with reference to the number of iSCSI sessions similar to the above-mentioned path selection method (2). In the path setup selection embodiment (2), a path is selected with reference to the number of hops in the same way as the above-mentioned path selection method (3).

Path Setup Selection Embodiment (1): Reference of selection="Number of iSCSI Sessions"

In this embodiment (1), a spanning tree is selected with reference to the "number of iSCSI sessions".

Figure 14:
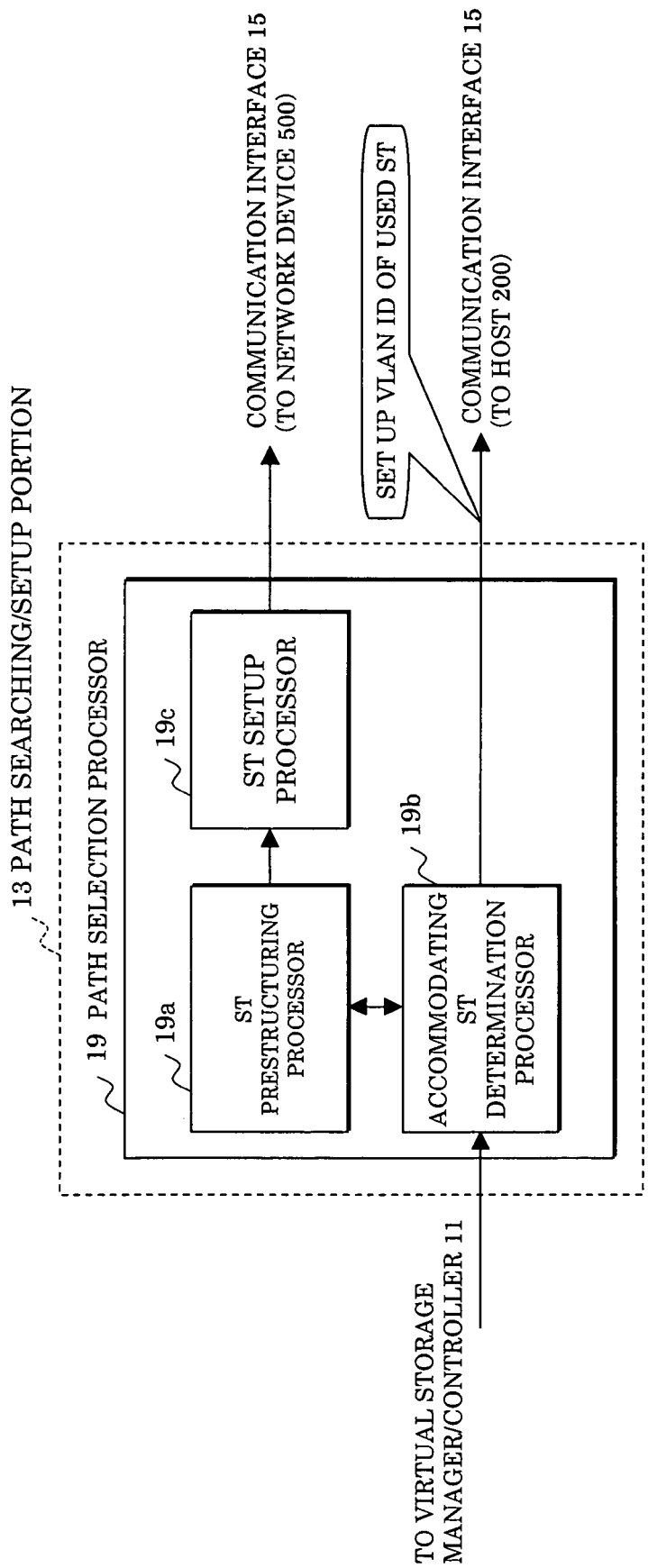
FIG. 14 is a block diagram showing an embodiment of an arrangement of a path selection processor included in a path searching/setup portion in a storage management server in a storage management system according to the present invention.

FIG. 14 shows an embodiment of an arrangement of the path selection processor 19 included in the path searching/setup portion 13 (see FIG. 2). The path selection processor 19 is provided with an ST prestructuring processor 19a, an accommodating ST determination processor 19b, and an ST setup processor 19c. The operation of the path selection processor 19 will now be described.

Step S11: The ST prestructuring processor 19a predetermines a plurality of spanning trees in which no loop occurs. The ST setup processor 19c transmits a spanning tree setup request to the network device 400 related to the spanning tree (path) determined and sets up the spanning tree.

Step S12: The accommodating ST determination processor 19b selects a spanning tree connecting the host 200 to the storage device 300, designated by the virtual storage manager/controller 11, from among a plurality of spanning trees preset. The accommodating ST determination processor 19b notifies the VLAN information (VLAN ID) of the spanning tree selected to the host 200.

Figure 15:
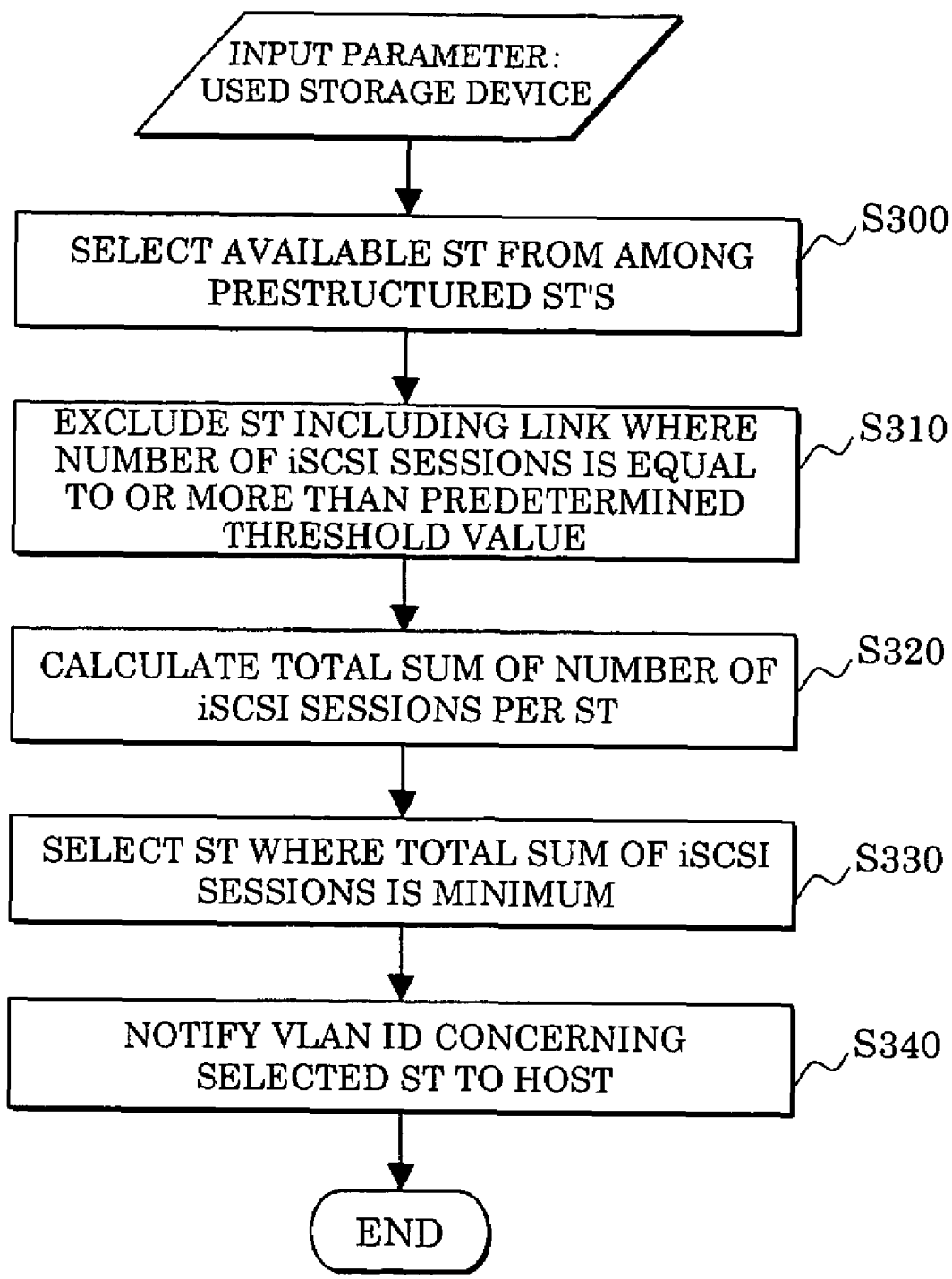
FIG. 15 is a flowchart showing an embodiment (1) of an ST selection processing operation included in a path selection processor in a storage management server of a storage management system according to the present invention.

FIG. 15 shows a path selection operation embodiment (1) indicating the path selection operation of the above-mentioned step S12 in more detail. In this embodiment (1), the accommodating ST determination processor 19b selects a spanning tree based on the "number of iSCSI sessions". Hereinafter, the path selection operation embodiment (1) will be described.

Step S300: The accommodating ST determination processor 19b selects an available spanning tree from among the prestructured spanning trees based on the used storage device 300.

Step S310: The accommodating ST determination processor 19b excludes spanning trees including links where the number of iSCSI sessions is equal to or more than a predetermined threshold value preset.

Steps S320 and S330: The accommodating ST determination processor 19b further calculates a total sum of the number of iSCSI sessions per spanning tree, and selects a spanning tree where the total sum of the iSCSI sessions is minimum.

Step S340: The accommodating ST determination processor 19b notifies the VLAN ID concerning the selected spanning tree to the host 200.

Thus, it becomes possible for the host 200 to exchange information with the virtualized storages through the spanning tree where the total sum of the iSCSI sessions is minimum, so that it is possible to reduce the deterioration of the network transfer performance due to the bandwidth shortage or the like.

Path Setup Selection Operation Embodiment (2): Reference of Selection="Number of Hops"

In this embodiment (2), a spanning tree is selected with reference to the number of hops instead of the number of iSCSI sessions in the embodiment (1).

The arrangement of the path selection processor 19 is the same as that shown in FIG. 14. The operations of the ST prestructuring processor 19a and the accommodating ST determination processor 19b are the same as those in the path selection method (1). However, the operation of the ST setup processor 19c is different from that in the path selection method (1). The operation of the path selection processor 19 will now be described.

Step S21: The ST prestructuring processor 19a predetermines a plurality of spanning trees in which no loop occurs, and the ST setup processor 19c sets up the spanning trees in the network.

Step S22: The accommodating ST determination processor 19b selects the spanning tree which the host 200 uses based on the number of hops, and notifies the VLAN information of the selected spanning tree to the host 200.

Figure 16:
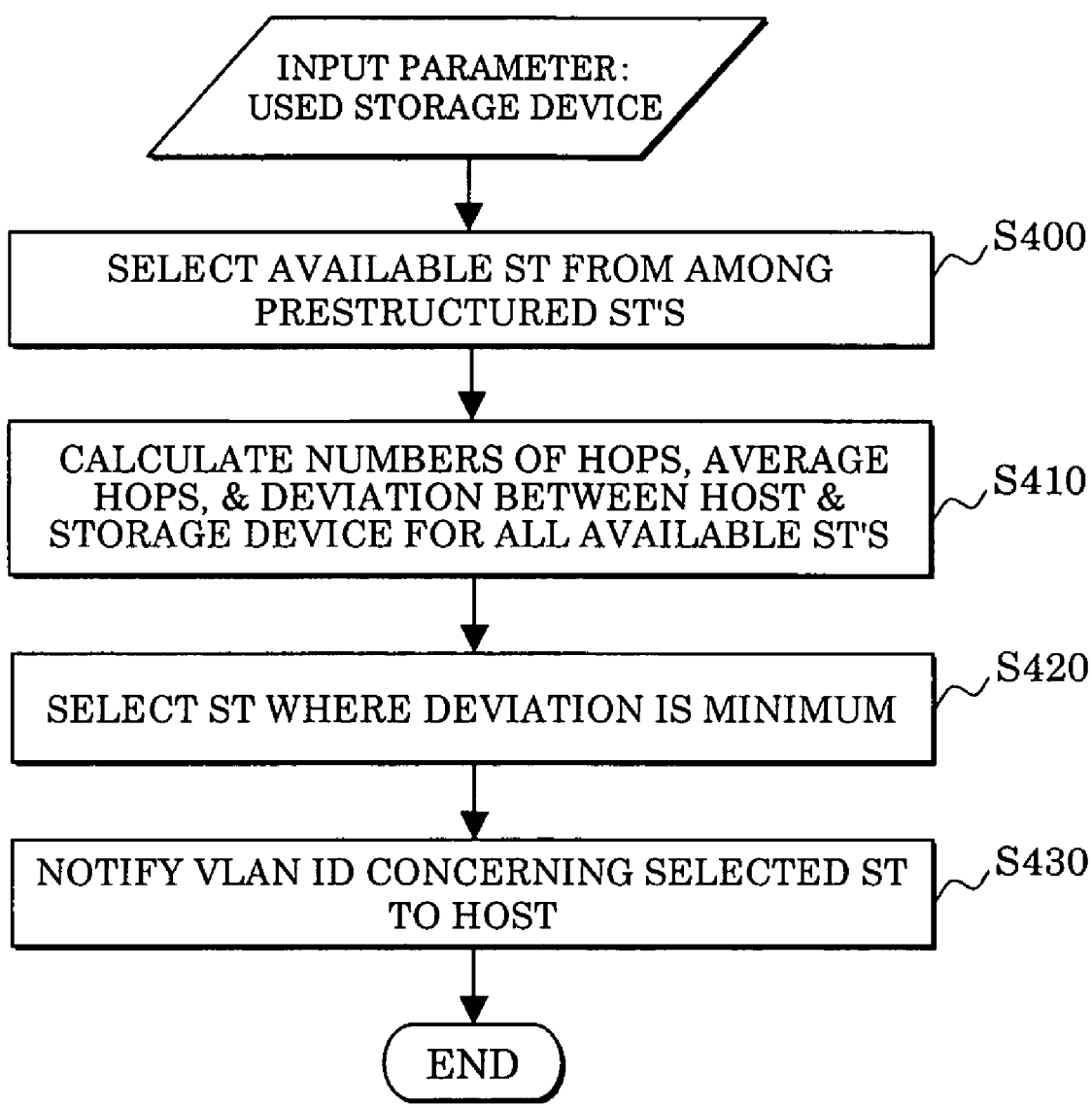
FIG. 16 is a flowchart showing an embodiment (2) of an ST selection processing operation included in a path selection processor in a storage management server of a storage management system according to the present invention.
Figure 17:
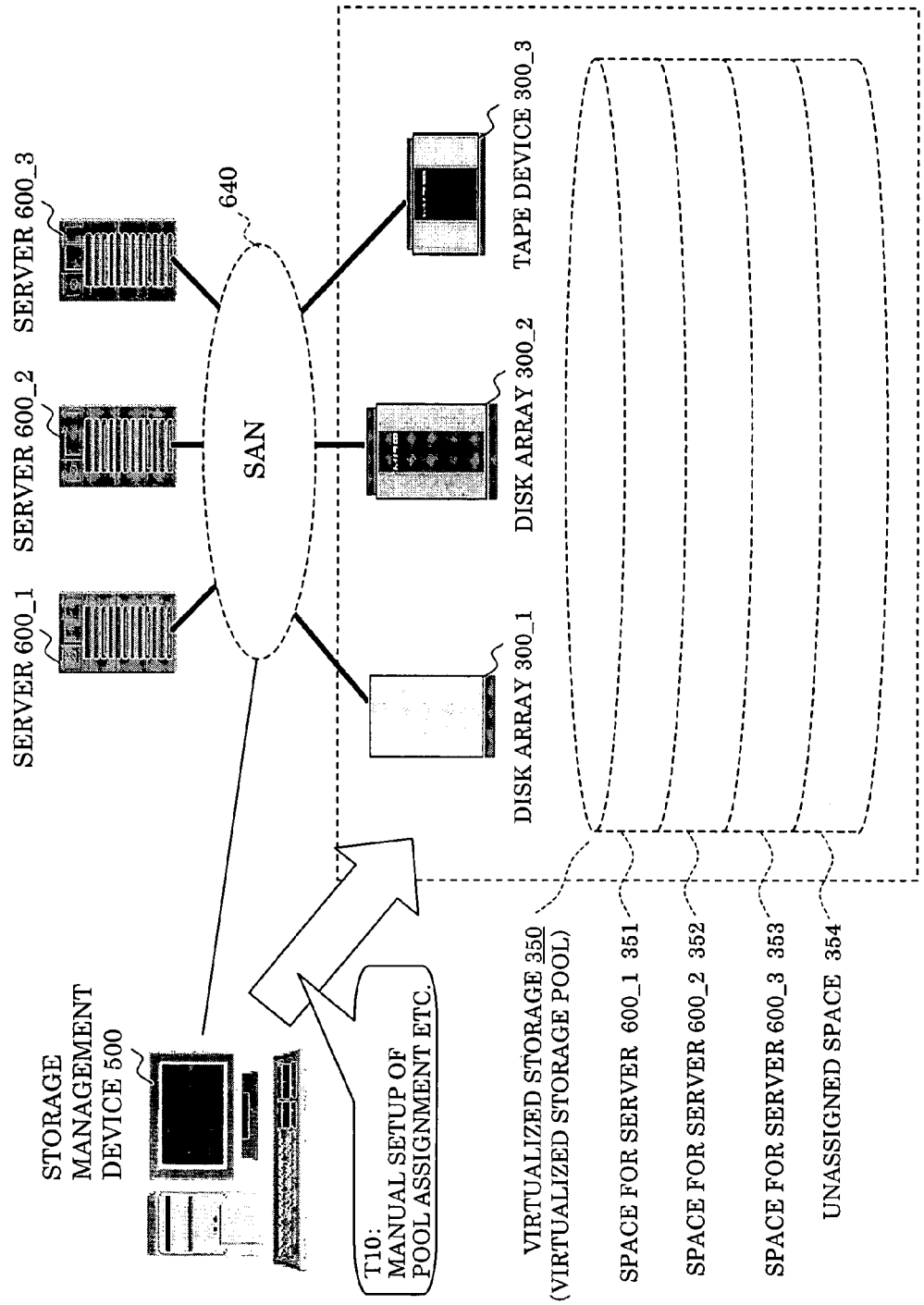
FIG. 17 is a block diagram showing a virtualized storage system in a conventional storage area network.
Figure 18:
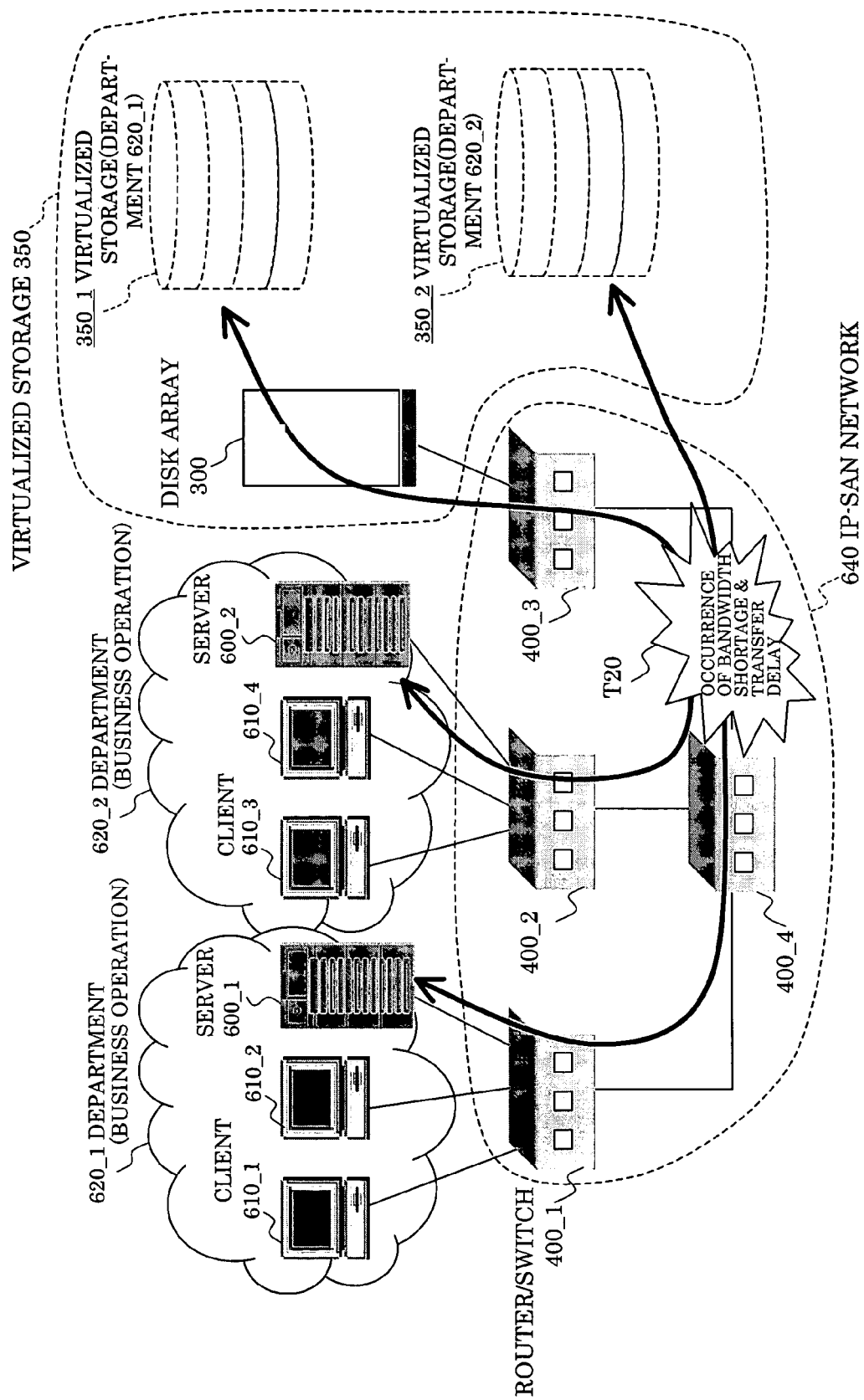
FIG. 18 is a block diagram showing a deterioration example (1) of a network transfer performance in a conventional virtualized storage system.
Figure 19:
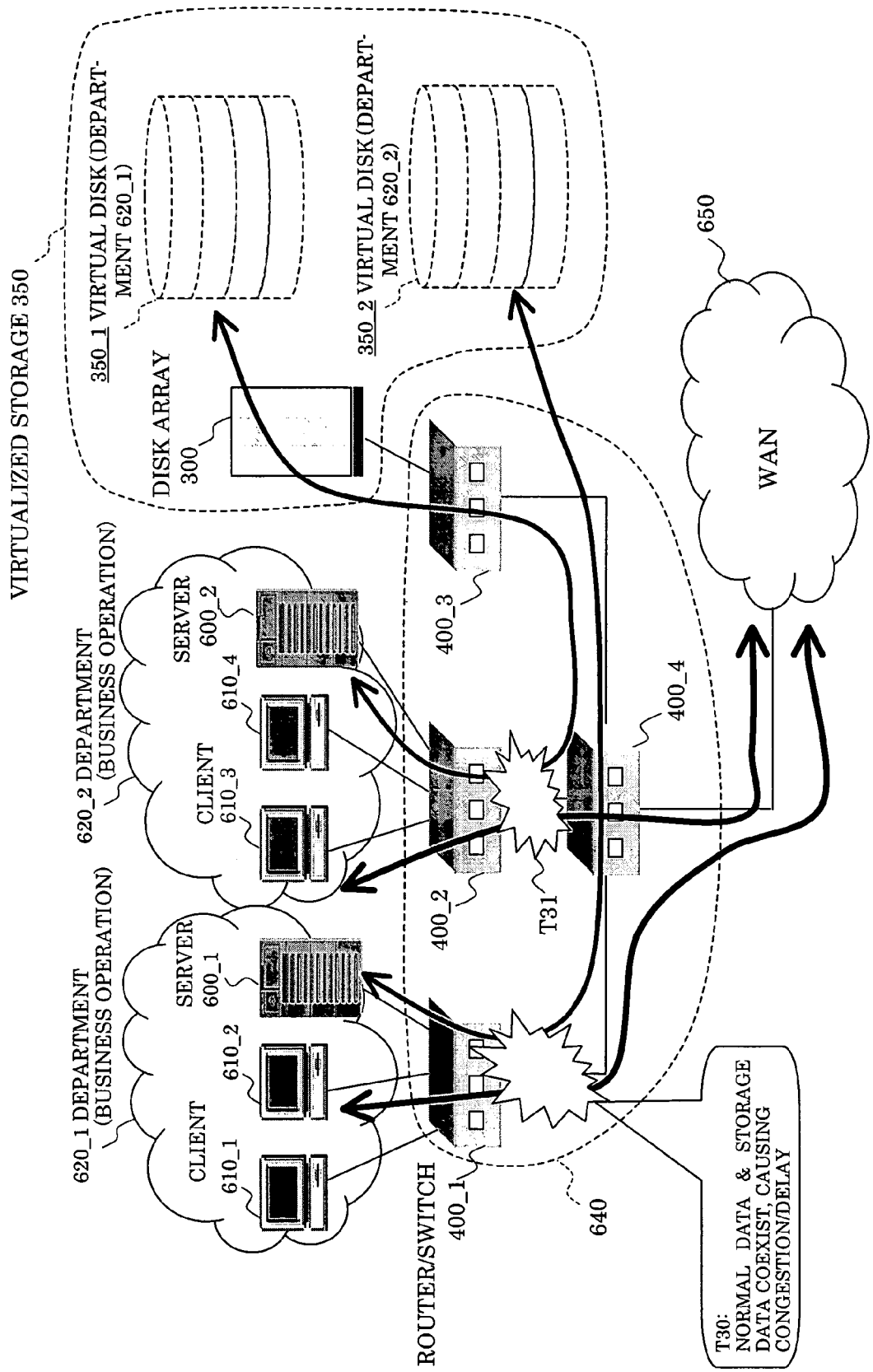
FIG. 19 is a block diagram showing a deterioration example (2) of a network transfer performance in a conventional virtualized storage system.

FIG. 16 shows a path selection operation embodiment (2) indicating the path selection operation of the above-mentioned step S22 in more detail. In this embodiment (2), the accommodating ST determination processor 19b selects the spanning tree based on the "number of hops". Hereinafter, the path selection operation embodiment (2) will be described.

Step S400: The accommodating ST determination processor 19b, selects an available spanning tree from among the prestructured spanning trees based on the used storage device.

Step S410: The accommodating ST determination processor 19b calculates the number of hops, the number of average hops, and a deviation between the host 200 and the storage device with respect to all of the available spanning trees.

Steps S420 and S430: The accommodating ST determination processor 19b selects a spanning tree where the deviation is minimum and notifies the VLAN ID concerning the selected spanning tree to the host 200.

Thus, it becomes possible for the host 200 to exchange information with the virtualized storage through the spanning tree where the deviation of the number of hops is

What we claim is:

1. A storage management system comprising:
   one or more network devices;
   one or more hosts and storage devices connected with storage data paths (sessions/connections) on a network composed of the network devices; and
   a storage management server connected to the network devices, the hosts, and the storage devices;
   the storage management server having a storage state manager which manages a storage usage state in each storage device, a network state manager which manages a traffic state of the network by monitoring each network device, and a path searching/setup portion which determines the storage data path to be set up in the network device based on the storage usage state and the traffic state.

2. The storage management system as claimed in claim 1 wherein the storage management server is further provided with a virtual storage manager/controller selecting a storage space suitable for a storage capacity requested from the host or a system manager based on the storage usage state, and the path searching/setup portion determines the storage data path based on the selected storage space and the traffic state.

3. The storage management system as claimed in claim 1 wherein the storage usage state comprises a used bandwidth of a link or a number of communication channels.

4. The storage management system as claimed in claim 1 wherein when determining a storage data path of a single host, the path searching/setup portion monitors a path usage state of another host as the traffic state, and determines the storage data path of the host based on the traffic state.

5. The storage management system as claimed in claim 2 wherein the virtual storage manager/controller notifies the selected storage space and the determined storage data path to the host.

6. The storage management system as claimed in claim 2 wherein the path searching/setup portion prestructures a plurality of spanning trees between the host and the storage device, and selects the storage data path from among the spanning trees based on a number of iSCSI sessions or hops of the spanning trees upon a storage capacity request from the host.

7. The storage management system as claimed in claim 1 wherein the path searching/setup portion notifies the determined storage data path to the host.

8. The storage management system as claimed in claim 2 wherein when a plurality of storage spaces are selected, the path searching/setup portion selects a storage data path by which a deviation of a delay time of the storage data paths connecting the host to the selected storage space is reduced.

9. The storage management system as claimed in claim 1 wherein the storage data path is determined by a VLAN or an MPLS system.

10. The storage management system as claimed in claim 1 wherein the network device comprises an IP network device.

11. The storage management system as claimed in claim 1 wherein when a fault occurs or a fault occurrence is predicted respectively in the storage device and the network device, the path searching/setup portion searches and determines, based on the storage usage state and the traffic state, a substitute storage for a storage space in the storage device in which the fault occurs or the fault occurrence is predicted, or searches and determines a substitute path for a storage data path related to the network device in which the fault occurs or the fault occurrence is predicted.

12. The storage management system as claimed in claim 1 wherein the host is provided with a virtualization mapper providing a storage space allocating request to the storage management server, and associating a storage space replied to the storage space allocating request with a virtual storage, and a path information setup portion setting up path information of the storage data path in storage data so that the storage data may be transmitted through the storage data path replied to the storage space allocating request.

13. The storage management system as claimed in claim 12 wherein the path information comprises a tag.

14. The storage management system as claimed in claim 12, further comprising a SCSI controller converting the storage data into SCSI data and setting up a SCSI session for transferring the SCSI data on the network,
    the virtualization mapper associating the SCSI session with the virtual storage.

15. The storage management system as claimed in claim 14 wherein the SCSI controller converts the storage data into iSCSI data and sets up an iSCSI session for transferring the iSCSI data on an IP network, and the virtualization mapper associates the virtual storage with the iSCSI session.

16. The storage management system as claimed in claim 12, further comprising a RAID controller realizing a RAID function between a plurality of logical storage spaces.

17. The storage management system as claimed in claim 16 wherein when a fault occurs in the storage device, the RAID controller notifies the fault to the storage management server.

18. A computer-readable medium encoded with a computer program for managing a storage management system comprising one or more network devices, one or more hosts and storage devices connected with storage data paths (sessions/connections) on a network composed of the network devices, and a storage management server connected to the network devices, the hosts, and the storage devices, the program, when executed by a computer, causing the computer to perform a method comprising:
    managing a storage usage state of each storage device;
    managing a traffic state of the network by monitoring each network device; and
    determining the storage data path to be set up in the network device based on the storage usage state and the traffic state.

19. A method of setting a storage data path in a storage management system comprising one or more network devices, one or more hosts, and storage devices connected on a network composed of the network devices, comprising:
    managing a storage usage state of each storage device;
    managing a traffic state of the network by monitoring each network device; and
    determining the storage data path to be set up in each network device based on the storage usage state and the traffic state.

* * * * *